United States Patent
Henry et al.

(10) Patent No.: US 9,541,196 B2
(45) Date of Patent: Jan. 10, 2017

(54) MINIATURE MCKIBBEN ACTUATOR

(71) Applicant: The Boeing Company, Chicago, IL (US)

(72) Inventors: Christopher P. Henry, Thousand Oaks, CA (US); Sloan P. Smith, Calabasas, CA (US)

(73) Assignee: THE BOEING COMPANY, Chicago, IL (US)

(*) Notice: Subject to any disclaimer, the term of this patent is extended or adjusted under 35 U.S.C. 154(b) by 305 days.

(21) Appl. No.: 14/228,252

(22) Filed: Mar. 28, 2014

(65) Prior Publication Data

US 2014/0208937 A1     Jul. 31, 2014

Related U.S. Application Data

(63) Continuation-in-part of application No. 12/694,476, filed on Jan. 27, 2010, now abandoned.

(60) Provisional application No. 61/260,923, filed on Nov. 13, 2009.

(51) Int. Cl.
| | | |
|---|---|---|
| F15B 15/10 | (2006.01) | |
| F16J 3/02 | (2006.01) | |
| F16J 3/06 | (2006.01) | |

(52) U.S. Cl.
CPC .............. *F16J 3/02* (2013.01); *F15B 15/103* (2013.01); *F16J 3/06* (2013.01); *Y10T 29/53813* (2015.01)

(58) Field of Classification Search
CPC ...................................................... F15B 15/103
See application file for complete search history.

(56) References Cited

U.S. PATENT DOCUMENTS

| | | |
|---|---|---|
| 4,739,692 A | 4/1988 | Wassam et al. |
| 4,751,869 A | 6/1988 | Paynter |
| 4,841,845 A | 6/1989 | Beullens |
| 5,018,506 A | 5/1991 | Danna et al. |
| 5,083,498 A | 1/1992 | Sato et al. |
| 6,223,648 B1 | 5/2001 | Erickson |
| 6,666,127 B2 | 12/2003 | Peles |
| 6,684,754 B2 | 2/2004 | Comer |
| 6,868,773 B2 | 3/2005 | Davis et al. |
| 6,870,343 B2 | 3/2005 | Borenstein et al. |
| 7,837,144 B2 | 11/2010 | Kothera et al. |
| 2002/0083828 A1 | 7/2002 | Bernier |

OTHER PUBLICATIONS

Li et al., "A Variable Transverse Stiffness Sandwich Structure using Fluidic Flexible Matrix Composite (F2CM)," Proc. of SPIE, Mar. 2008, vol. 6928, 12 pages.

Philen et al., "Fluidic Flexible Matrix Composites for the Tailoring of Variable Stiffness Adaptive Structures," 48th AIAA/ASME/ASCE/AHS/ASC Structures, Structural Dynamics, and Materials Conference, Apr. 2007, 11 pages.

(Continued)

*Primary Examiner* — F. Daniel Lopez
(74) *Attorney, Agent, or Firm* — Yee & Associates, P.C.

(57) ABSTRACT

A hydraulic actuator includes a tubular bladder having first and second ends, an expandable and collapsible sleeve provided on the tubular bladder, a fluid inlet fitting provided in fluid communication with the tubular bladder and at least one mechanical connection provided along the tubular bladder. The hydraulic actuator may have flexibility and an overall diameter of less than about 5 mm.

19 Claims, 10 Drawing Sheets

(56) References Cited

OTHER PUBLICATIONS

Shan et al., "Variable Stiffness Structures Utilizing Fluidic Flexible Matrix Composites," Journal of Intelligent Material Systems and Structures, Mar. 2009, vol. 20, pp. 443-456.
Philen et al., "Variable Stiffness Adaptive Structures Utilizing Hydraulically Pressurized Flexile Matrix Composites with Valve Control ," 47th AIAA/ASME/ASCE/AHS/ASC Structures, Structural Dynamics, and Materials Conference, May 2006, 11 pages.
Henry et al., "Miniature McKibben Actuator," U.S. Appl. No. 12/694,476, filed Jan. 27, 2010, 49 pages.
Intellectual Property Office Combined Search and Examination Report, dated Jul. 27, 2015, regarding Application No. GB1502982.0, 4 pages.

MINIATURE MCKIBBEN ACTUATOR

CROSS-REFERENCE TO RELATED APPLICATIONS

This application is a Continuation-in-Part application of U.S. application Ser. No. 12/694,476, filed Jan. 27, 2010, which claims the benefit of and incorporates by reference in its entirety U.S. provisional application No. 61/260,923, filed Nov. 13, 2009, and entitled "Miniature McKibben Actuators for Aircraft Applications".

BACKGROUND

1. Field

The disclosure generally relates to actuators suitable for use in morphing applications. More particularly, the disclosure relates to a miniature McKibben-based actuator which is suitable for morphing deformations of composite materials.

2. Background

McKibben actuators are hydraulic actuators which include an inflated tubular bladder which is constrained by an external expandable sleeve such as a braid. The braid geometry of the braid specifies how kinematics of radial tube inflation relates to contraction or extension of the braid. McKibben actuators may be advantageous in aerospace and other applications because their size may be made sufficiently small to permit embedding and integration into composites, especially for morphing deformations of composites. Conventional McKibben actuators, however, may be inordinately large for aerospace and other applications.

Therefore, a miniature McKibben-based actuator which is of sufficient size and length constraints to permit the actuator to be embedded and integrated into composite materials for morphing deformations of composite materials in aerospace and other applications is needed.

SUMMARY

The disclosure is generally directed to a miniature McKibben-based hydraulic actuator which has sufficient size and length to be embedded and integrated into composite materials in aerospace and other applications. An illustrative embodiment of the hydraulic actuator includes a tubular bladder having first and second ends, an expandable and collapsible sleeve provided on the tubular bladder, a fluid inlet fitting provided in fluid communication with the tubular bladder and at least one mechanical connection provided along the tubular bladder. The hydraulic actuator may have flexibility and an overall diameter of less than about 5 mm.

In some embodiments, the hydraulic actuator may include a tubular bladder having first and second ends; an expandable and collapsible braided sleeve having a plurality of braid strips provided on the tubular bladder; a fluid inlet fitting provided at the first end of the tubular bladder; a selected one of a second fluid inlet fitting and a plug provided at the second end of the tubular bladder; and at least one mechanical connection provided along the tubular bladder. The hydraulic actuator may have flexibility and an overall diameter of about less than about 5 mm, or in the range between about 0.5 mm and about 5 mm. The word "about" in this writing means value that may be +/−10% of the given value.

The disclosure is further generally directed to a method of fabricating a hydraulic actuator. An illustrative embodiment of the method includes providing a tubular bladder having first and second ends, providing an expandable and collapsible sleeve, sliding the sleeve over the bladder, providing at least one fluid inlet fitting in fluid communication with the tubular bladder and providing at least one mechanical connection along the bladder. The hydraulic actuator may have flexibility and an overall diameter of less than about 5 mm.

In some embodiments, the hydraulic actuator may include an elastomeric tubular bladder having first and second ends and an outer diameter of about 0.020 inch; an expandable and collapsible bi-axially braided sleeve having a plurality of braid strips provided on the tubular bladder and having a nominal diameter of about 0.050 inch and an operating pressure of at least about 100 psi; a fluid inlet fitting provided at the first end of the tubular bladder; a plug provided at the second end of the tubular bladder; a first mechanical connection provided at the fluid inlet fitting; an anchoring structure attached to the first mechanical connection; a second mechanical connection provided at the plug; and a structure to be loaded attached to the second mechanical connection. The hydraulic actuator may have flexibility and an overall diameter of less than about 5 mm.

In some embodiments, the method of fabricating a flexible hydraulic actuator may include providing an elastomeric tubular bladder having first and second ends and an outer diameter of about 0.020 inch (or about 0.5 mm) and an operating pressure of between about 300~600 psi; providing an expandable and collapsible bi-axially braided sleeve having a plurality of braid strips provided on the tubular bladder and having a nominal diameter of about 0.050 inch and an operating pressure of at least about 100 psi; sliding the sleeve over the bladder; providing a first fluid inlet fitting at the first end of the tubular bladder and one of a plug and a second fluid inlet fitting at the second end of the tubular bladder; providing first and second clamps and crimping the sleeve and the bladder against the first fluid inlet fitting with the first clamp and crimping the sleeve and the bladder against the one of a plug and a second fluid inlet fitting with the second clamp; providing a first mechanical connection at the fluid inlet fitting; providing a second mechanical connection at the plug; and providing a plurality of mechanical connections between the first mechanical connection and the second mechanical connection. The hydraulic actuator may have an overall diameter of less than about 5 mm.

The disclosure is further generally directed to a method of controlling a flexible miniature McKibben actuator. An illustrative embodiment of the method includes providing an actuator with at least one mechanical attachment point and having an overall diameter of less than about 5 mm; providing an actuator control system; controlling flow of hydraulic fluid from the actuator control system through the fluid inlet fitting into the bladder; moving the mechanical attachment point by expanding the bladder and the sleeve; and controlling flow of hydraulic fluid from the bladder, through the fluid inlet fitting and back into the actuator control system.

The disclosure is further generally directed to a method of controlling a length and shape of a flexible hydraulic actuator. An illustrative embodiment of the method includes providing a flexible hydraulic actuator having an overall diameter of less than about 5 mm, a bladder having first and second ends and an operating pressure of greater than about 100 psi, an expandable and collapsible sleeve over said bladder and at least one mechanical attachment point between the first and second ends of the bladder; providing an actuator control system; and controlling a length and a shape of said actuator by providing a flow of hydraulic fluid from said actuator control system through at least one of said first fluid fitting and said second fluid inlet fitting into said bladder.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
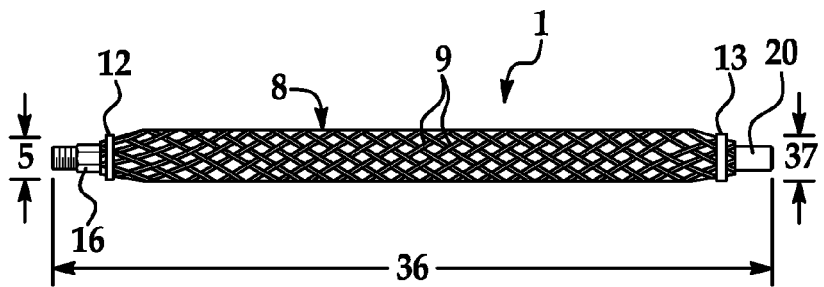
FIG. 1 is an illustration of a side view of an embodiment of the miniature McKibben actuator.
Figure 2:
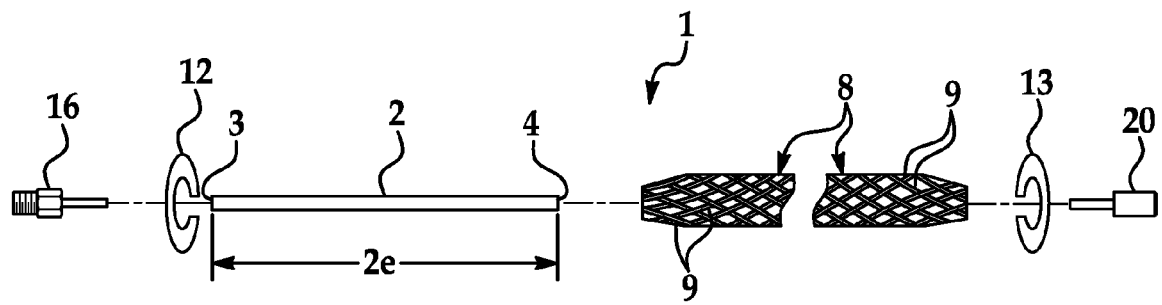
FIG. 2 is an illustration of an exploded sectional view of an embodiment of the McKibben actuator.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Referring initially to FIGS. 1-7, an illustrative embodiment of the miniature McKibben actuator, hereinafter "actuator," is generally indicated by reference numeral 1. The actuator 1 may include a generally elongated bladder 2 which may be a resilient elastomeric material. Suitable materials for the bladder 2 include VITON®, urethane, silicone, latex and/or other elastomeric polymer, for example and without limitation. The bladder 2 may have a first end 3 and a second end 4. In some embodiments, the bladder 2 may have an outer diameter (OD) 2a of about 0.020 inch and a wall thickness 2b of about 0.003 inch.

An expandable and collapsible sleeve 8 may be extended over the bladder 2. In some embodiments, the sleeve 8 may be a braid having braid strips 9. The braid strips 9 of the sleeve 8 may be any material that can accommodate the necessary performance and environmental conditions in which the actuator 1 is applied. Suitable materials for the braid strips 9 of the sleeve 8 include nylon, polyester, glass fiber, carbon fiber, Kevlar fiber and/or other structural fiber or tow-based materials, for example and without limitation. In some embodiments, the braid strips 9 may be made with fiber tows and may have a relatively open biaxial construction such that the differently-directed tows (clockwise and counterclockwise) can "scissor" with respect to one another during expansion and contraction of the sleeve 8. In some embodiments, the sleeve 8 may have a nominal diameter of about 0.05 inch with a generally 45-degree braid angle. In some embodiments, the overall diameter 5 of the actuator 1 may be less than about 5 mm.

Figure 3:
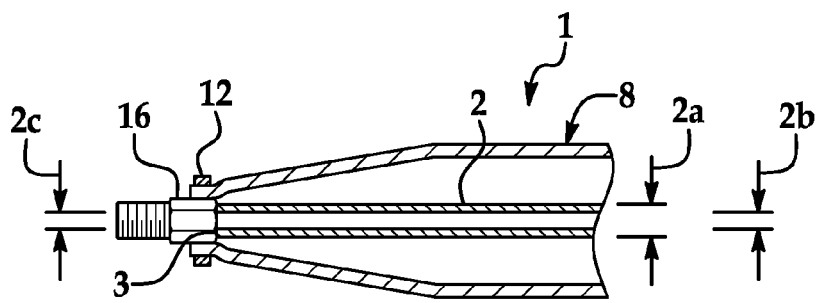
FIG. 3 is an illustration of a cross-sectional view of an end portion of an embodiment of the miniature McKibben actuator.

A fluid inlet fitting 16 may be inserted in the first end 3 of the bladder 2. In some embodiments, a plug 20 may be inserted in the second end 4 of the bladder 2. As shown in FIG. 3, a first clamp 12 may crimp the sleeve 8 against the bladder 2 and the fluid inlet fitting 16 at the first end 3 of the bladder 2. A second clamp 13 (FIG. 4) may similarly crimp the sleeve 8 against the bladder 2 and the plug 20 at the second end 4 of the bladder 2.

Figure 6:
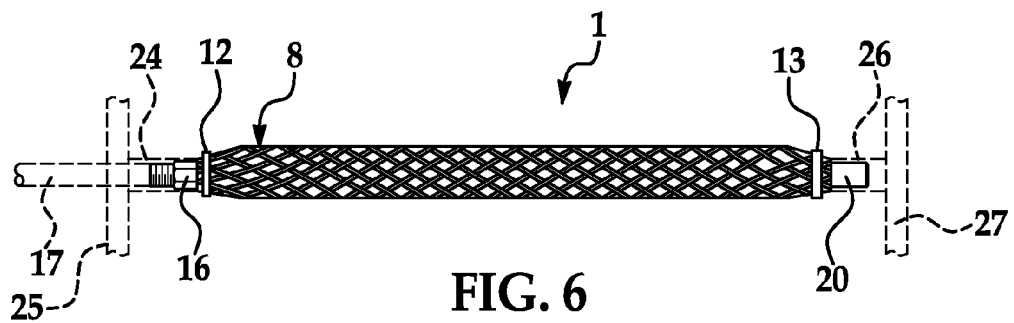
FIG. 6 is an illustration of a side view of an embodiment of the miniature McKibben actuator, with a pair of mechanical connections (shown in phantom) provided at respective ends of the actuator and a pair of structures (shown in phantom) engaged by the respective mechanical connections.

Fabrication of the actuator 1 may include sliding the sleeve 8 over the bladder 2 such that the sleeve 8 is compressed by approximately 15~20% compared to the un-stretched length of the bladder 2. An epoxy such as, for example and without limitation, a quick-curing epoxy (not shown) may be applied to the fluid inlet fitting 16 and the plug 20, after which the fluid inlet fitting 16 may be inserted in the first end 3 and the plug 20 inserted in the second end 4 of the bladder 2. Once the epoxy is cured, the bladder 2 with fluid inlet fitting 16 and plug 20 may be inserted into the sleeve 8. The sleeve 8 may then be secured in place over the bladder 2 using the first clamp 12 and the second clamp 13. The first clamp 12 and the second clamp 13 may be positioned such that the first clamp 12 and the second clamp 13 crimp the areas of the bladder 2 where the barbed connectors (not shown) of the fluid inlet fitting 16 and the plug 20 are located. After the sleeve 8 is crimped in place, the excess portions of the sleeve 8 outside the fluid inlet fitting 16 and the plug 20 may be adjusted and secured in an arrangement that would allow the actuator 1 to be anchored at the fluid inlet fitting 16 end and axially loaded at the plug 20 end. Accordingly, as shown in FIG. 6, in some applications a first mechanical connection 24 may anchor the fluid inlet fitting 16 to an anchoring structure 25. A second mechanical connection 26 may connect the plug 20 to a structure to be loaded 27.

Figure 7:
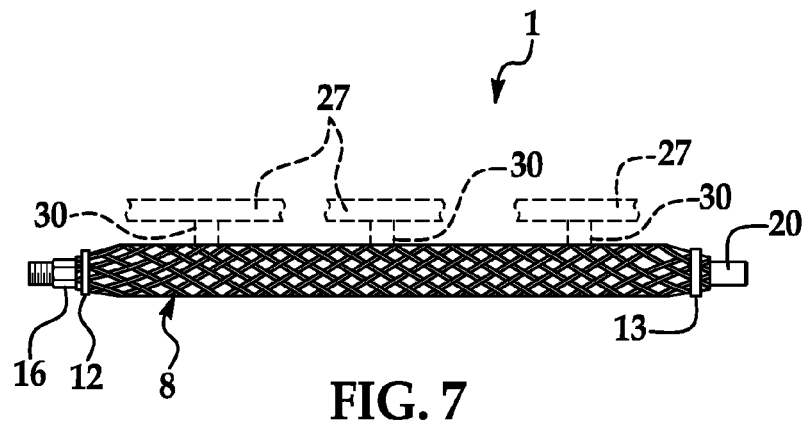
FIG. 7 is an illustration of a side view of an embodiment of the miniature McKibben actuator, with a pair of mechanical connections (shown in phantom) provided at respective ends of the actuator and a pair of structures (shown in phantom) engaged by the respective mechanical connections.

As shown in FIG. 7, in some embodiments mechanical connections 30 may be provided at selected positions in series or in parallel along the length of the sleeve 8 to facilitate attachment of the actuator 1 to structure or structures 27 to be loaded. In some embodiments, the mechanical connections 30 may include adhesive which bonds the exterior diameter of the actuator 1 to the structure or structures 27. This arrangement may inactivate the bonded length of the actuator 1. In that case, the adhesive bond may be tailored to help distribute loads between the actuator 1 and the structure or structures 27. Therefore, the potential of the structure or structures 27 to pinch fluid flow and "cut" into the actuator 1 may be minimized.

The wall thickness 2b of the bladder 2 may be small in comparison to the radius 2c of the bladder 2. The relative diameter 2a-to-length 2e ratio of the bladder 2 may be determined by the speed of operation (the quantity of fluid passing into the bladder 2 of the actuator 1 per unit time) of the actuator 1, the pressure drop along the length of the actuator 1 and the ease of construction and making the various hydraulic and mechanical connections. The length 36 of the actuator 1 may be in excess of three times the diameter 37 of the actuator 1 due to the crimped end constraints imparted by the first clamp 12 and the second clamp 13 as they restrict the kinematics of the braided sleeve 8. In some embodiments, multiple mechanical connections 30 along the length of the actuator 1, as was heretofore described with respect to FIG. 7. Therefore, additional actuator length may be required to achieve the original displacement of the actuator 1. In an adhesive mechanical attachment, the displacing length 38 of the actuator 1 may decrease by 1~3 diameters, restricting kinematics of the sleeve 8 locally. This restriction in kinematics may prevent actuation strains along this length portion 38 of the actuator 1, but may help spread the structural load 39 on the actuator 1. Alternatively, the mechanical connections 30 may be achieved by physical clamping or crimping 31 of the sleeve 8. The tows or fibers (not shown) used in fabrication of the braid strips 9 of the sleeve 8 may be selected such that they are sufficiently spread over the bladder 2 so as not to "cut into" the bladder 2 but still maintain the biaxial kinematics necessary to permit actuation.

Figure 4:
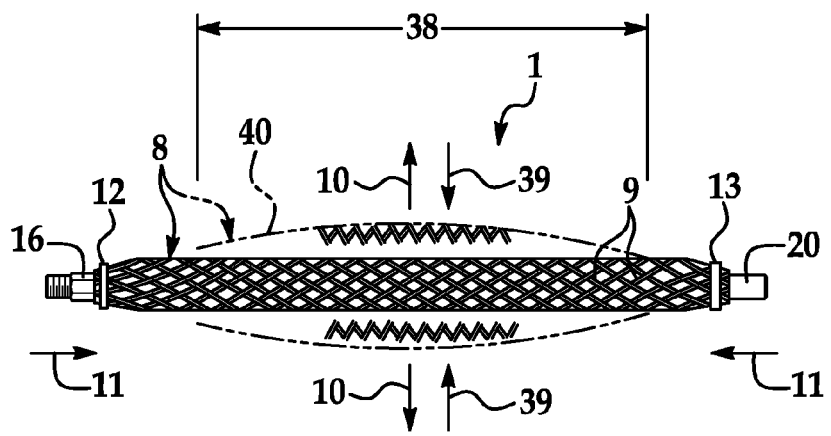
FIG. 4 is an illustration of a side view of an embodiment of the miniature McKibben actuator, more particularly illustrating expansion and contraction phases of the actuator.
Figure 5:
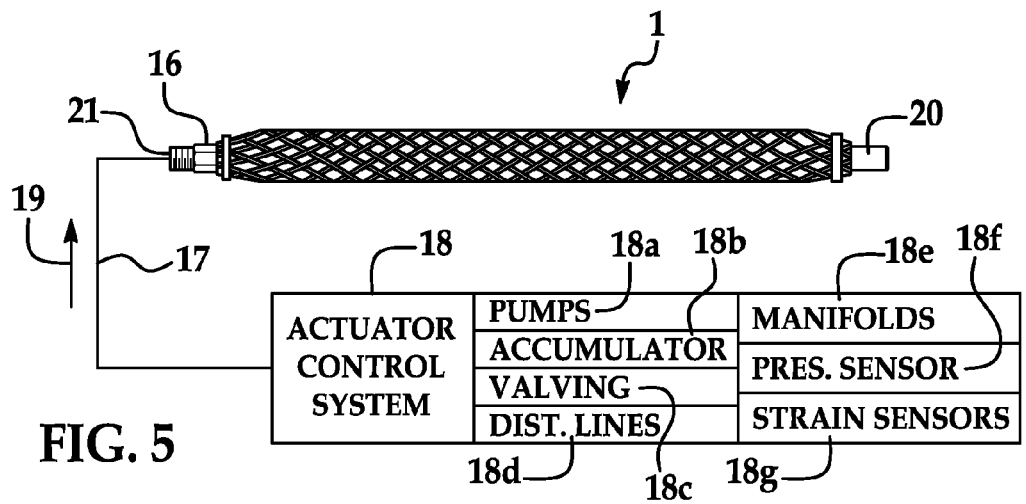
FIG. 5 is an illustration of a block diagram which illustrates an actuator control system connected to an embodiment of the miniature McKibben actuator.

Referring to FIGS. 4 and 5, an actuator control system 18 (FIG. 5) may be disposed in fluid communication 21 with the fluid inlet fitting 16 through a fluid inlet conduit 17. The actuator control system 18 may include elements 18a-18g such as pumps 18a, accumulators 18b, valving 18c, distribution lines 18d, manifolds 18e, pressure sensors 18f and strain sensors 18g. These elements 18a-18g are arranged to distribute hydraulic fluid 19 (FIG. 5), which may be gas or liquid, into the bladder 2 through the fluid inlet conduit 17 and fluid inlet fitting 16, respectively. Accordingly, in application of the actuator 1, as it flows into the bladder 2, the hydraulic fluid 19 may expand the bladder 2 and the sleeve 8 outwardly, as indicated by the arrows 10 and by the phantom lines in FIG. 4. The sleeve 8 may constrain the outward expansion 10 of the bladder 2. This expanding action 10 of the bladder 2 may cause the actuator 1 to shorten, as indicated by the arrows 11, causing the actuator 1 to apply morphing or other pressure 10 to the structure or structures to be loaded 27 (FIGS. 6 and 7) which may be attached to the actuator 1. Subsequently, after the release of hydraulic pressure in the fluid inlet conduit 17, the hydraulic fluid 19 may flow from the bladder 2, causing the bladder 2 to contract back to the original configuration shown in solid lines in FIG. 4. In some applications, the hydraulic fluid 19 may have an operating pressure 10 of about 100~1000 psi. In some applications, the hydraulic fluid 19 may have an operating pressure of about 300~600 psi. In some embodiments, feedback from sensors 18f, 18g in the actuator control system 18 may be used to process the desired actuator functionality (such as antagonistic operation between two actuators 1, for example) and determine the control system signals (not shown) that are used to control valve and pump hydraulic hardware 18a-18g to deliver the appropriate time-controlled pressure output 10 of the hydraulic fluid 19.

In some applications of the actuator 1, the structure or structures to be loaded 27 may including morphing wing panels (not shown) in aerospace applications. The actuator 1 may be amenable to any applications that have size, length and mass constraints including without limitation seals, robotics, UAV control authority and other applications where localized, flexible or high strain but length-constrained actuation is needed. These may include fixed wing and swing wing aircraft. Additionally, the actuator 1 may have applicability to wings, stabilizers, cunards, winglets, flaps, doors, retractable components or instruments, resizable compartments and control surfaces.

It will be appreciated by those skilled in the art that the actuator 1 may provide localized deformation control with high stiffness within an aircraft skin, particularly a wing skin. The actuator 1 may provide the proper high actuation strain and stress needed for morphing deformations in other aerospace applications and other applications outside the aerospace industry. The large actuation stress which may be needed for such applications may be enabled by hydraulic operation at high pressures (100~1000 psi) and high clamping integrity for the end connections. The actuator 1 is scalable to small size and therefore, is potentially embeddable and integratable into composites. The actuator 1 may be operated via remote valving. Normally-closed valving may permit the actuator 1 to hold and maintain a position or deformation without additional energy or power input. The speed of operation of the actuator 1 may be limited by the speed of fluid transfer through the valve and the elasticity of the bladder 2. The use of low glass transition bladder materials for the bladder 2 may permit the actuator 1 to withstand the temperature extremes encountered at flight altitude. The actuator 1 can permit multiple external mechanical attachment points along its length. This has the effect of distributing actuator displacement and force along its length which is beneficial to reducing the length of high-aspect ratio structures such as thin composite skins and sandwich panels.

Figure 8:
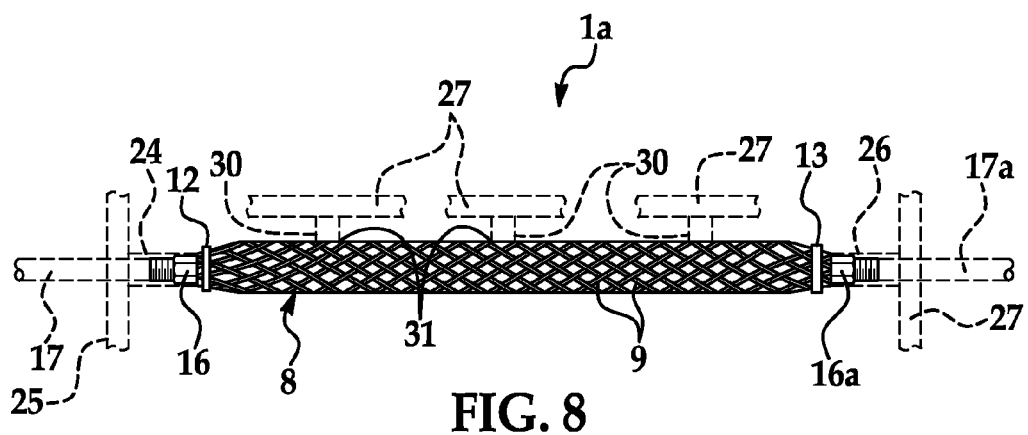
FIG. 8 is an illustration of a side view of an alternative embodiment of the miniature McKibben actuator, with a pair of fluid inlet fittings provided at respective ends of the actuator.
Figure 8A:
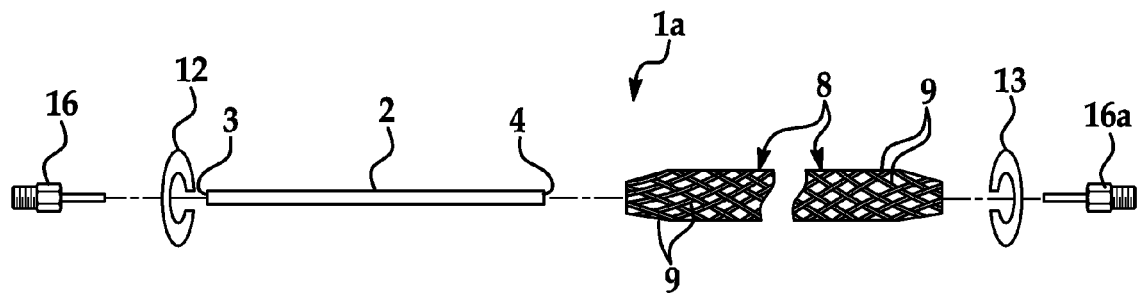
FIG. 8A is an illustration of an exploded sectional view of the embodiment of the miniature McKibben actuator shown in FIG. 8.
Figure 9:
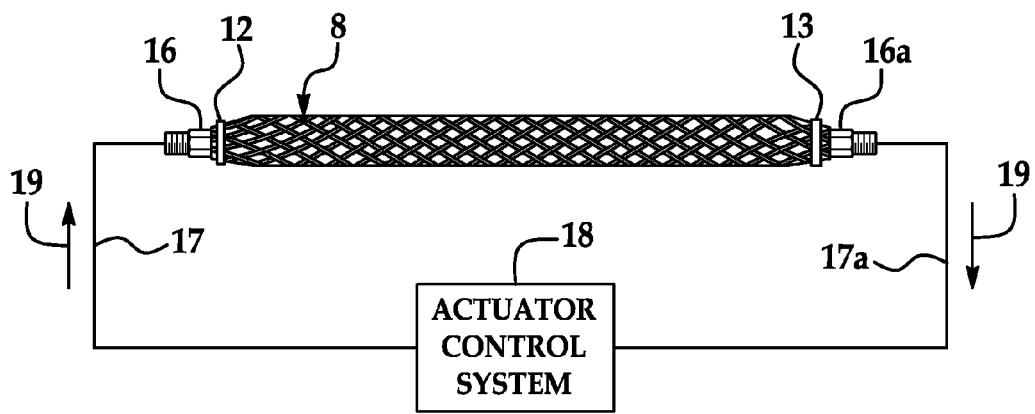
FIG. 9 is an illustration of a block diagram which illustrates an actuator control system connected to the embodiment of the miniature McKibben actuator shown in FIG. 8.

Referring next to FIGS. 8, 8A and 9, an alternative illustrative embodiment of the miniature McKibben actuator is generally indicated by reference numeral 1a. In the actuator 1a, a first fluid inlet fitting 16 may be provided on the first end 3 and a second fluid inlet fitting 16a may be provided on the second end 4 of the bladder 2. Accordingly, the actuator control system 18 may be connected to the first fluid inlet fitting 16 through a first fluid inlet conduit 17 and the second fluid inlet fitting 16a through a second fluid inlet conduit 17a. Operation of the actuator 1a may be as was heretofore described with respect to the actuator 1 in FIGS. 4 and 5. In operation of the actuator 1a, hydraulic fluid 19 may be distributed from the actuator control system 18 into the bladder 2 through the first fluid inlet conduit 17 and the first fluid inlet fitting 16, respectively. The hydraulic fluid 19 may be distributed from the bladder 2 back to the actuator control system 18 through the second fluid inlet fitting 16a and the second fluid inlet conduit 17a, respectively.

The mechanical connections 24, 26, 30 of the actuator 1a may be as was heretofore described with respect to the actuator 1 in FIGS. 6 and 7. Accordingly, as shown in FIG. 8, in some embodiments a first mechanical connection 24 may connect the first fluid inlet fitting 16 to an anchoring structure 25. A second mechanical connection 26 may connect the second fluid inlet fitting 16a to a structure to be loaded 27. Additionally or alternatively, one or multiple mechanical connections 30 may be provided at one or more selected locations along the length of the actuator 1a to facilitate attachment of the actuator 1a to one or more structures to be loaded 27.

Figure 10:
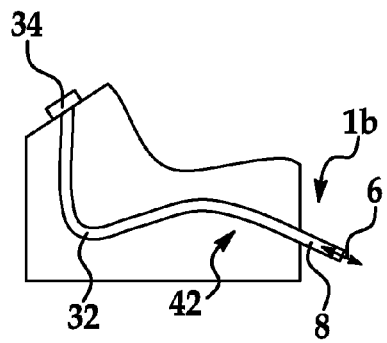
FIG. 10 is an illustration of a side view of a non-straight embodiment of the miniature McKibben actuator, inserted in a structure with the actuation output of the actuator unconfined and unguided by the braid of the actuator.
Figure 10A:
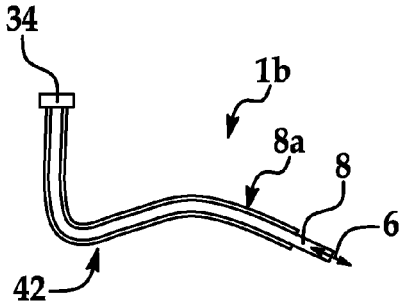
FIG. 10A is an illustration of a side view of the non-straight embodiment of the miniature McKibben actuator shown in FIG. 10, with the actuation output of the actuator protruding from the braid.
Figure 11:
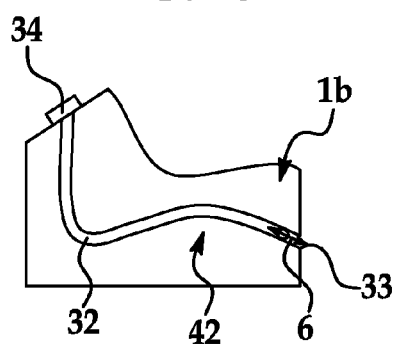
FIG. 11 is an illustration of a side view of a non-straight embodiment of the miniature McKibben actuator, inserted in a structure with the actuation output of the actuator confined and guided by the braid of the actuator.
Figure 11A:
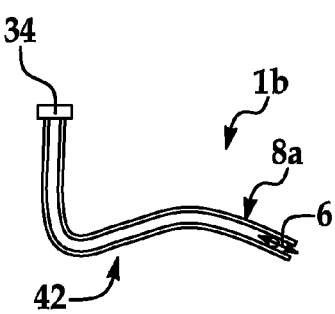
FIG. 11A is an illustration of a side view of the non-straight embodiment of the miniature McKibben actuator shown in FIG. 11, with the actuation output of the actuator protruding from the braid.

Referring to FIGS. 10-11A, the use of external braiding for the actuator 1 may permit long, flexible hydraulic/fluidic McKibben-based actuators to fit into non-straight pathways to achieve high displacement point-actuation. This flexibility 42 of the actuator 1 may help accommodate the space and length constraints of the actuator 1 in the application. Accordingly, a non-straight actuator 1b having flexibility 42 is shown inserted in an internal actuator channel 33 (FIG. 11) provided in a structure 32. A rigid or semi-rigid sheath 8a (FIGS. 10a and 11a) which may have a stiffness of >1 GPa may be provided over the sleeve 8 of the actuator 1b. A circular cross-section of the actuator channel 33 in the structure 32 may guide the displacement of the actuator 1b as it operates in the actuator channel 33 of the structure 32. In some embodiments, lubrication (not shown) may be used to promote uniform actuation of the actuator 1b within the sheath 8a.

As shown in FIGS. 10 and 10A, in some embodiments, the actuation output end 6 of the actuator 1b may be unconfined and unguided by the sheath 8a. The length of the sheath 8a may be sufficient to guide most of the actuator 1b through the curved path of the actuator channel 33 to an end mechanical connection 34 which may be provided on an upper end of the actuator 1b. As shown in FIGS. 11 and 11A, in some embodiments, the length of the sheath 8a may be sufficient to confine and guide the moving actuation output end 6 of the actuator 1b.

Figure 12:
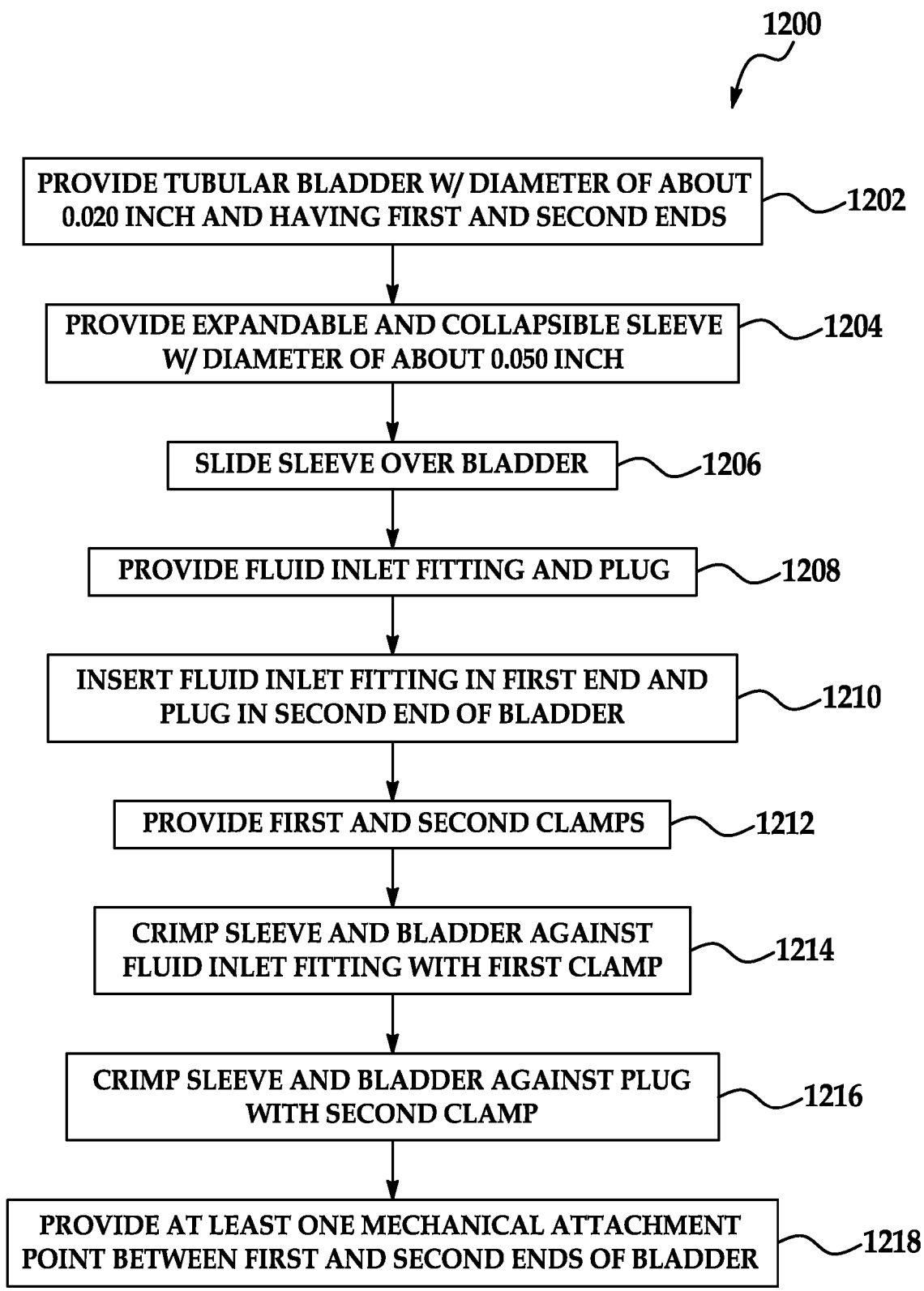
FIG. 12 is an illustration of a flow diagram of an exemplary method of fabricating an embodiment of the miniature McKibben actuator.

Referring next to FIG. 12, a flow diagram 1200 of an exemplary method of fabricating an illustrative embodiment of the miniature McKibben actuator 1 is shown. The actuator 1 may have an overall diameter 5 of less than about 5 mm. In block 1202, an elastomeric tubular bladder 2 having first end 3 and second end 4 is provided. In some embodiments, the bladder 2 may have an outer diameter (OD) 2a of about 0.020 inch. The bladder 2 may operate at fluid pressures greater than 100 psi. In some embodiments, the bladder 2 may operate at fluid pressures between about 300~600 psi. In block 1204, an expandable and collapsible sleeve 8 is provided. In some embodiments, the sleeve 8 may be a braided sleeve 8. In some embodiments, the braided sleeve 8 may be a biaxial braided sleeve. In some embodiments, the sleeve 8 may have a nominal diameter 37 of about 0.05 inch (about 1 mm). In block 1206, the sleeve 8 is slid over the bladder 2. In block 1208, a fluid inlet fitting 16 and a plug 20 are provided. In block 1210, the fluid inlet fitting 16 is inserted in the first end 3 and the plug 20 is inserted in the second end 4 of the bladder 2. In block 1212, first 12 and second 13 clamps are provided. In block 1214, the sleeve 8 and the bladder 2 are crimped against the fluid inlet fitting 16 using the first clamp 12. In block 1216, the sleeve 8 and the bladder 2 are crimped against the plug 20 using the second clamp 13. In block 1218, at least one first mechanical connection 24 may be provided at the first end 3, the second end 4 and/or between the first 3 and second 4 ends of the bladder 2. In some applications, a first mechanical connection 24 may be provided at the fluid inlet fitting 16 and a second mechanical connection 26 may be provided at the plug 20. In some applications, multiple mechanical connections 30 may be provided between the first mechanical connection 24 and the second mechanical connection 26.

Figure 12A:
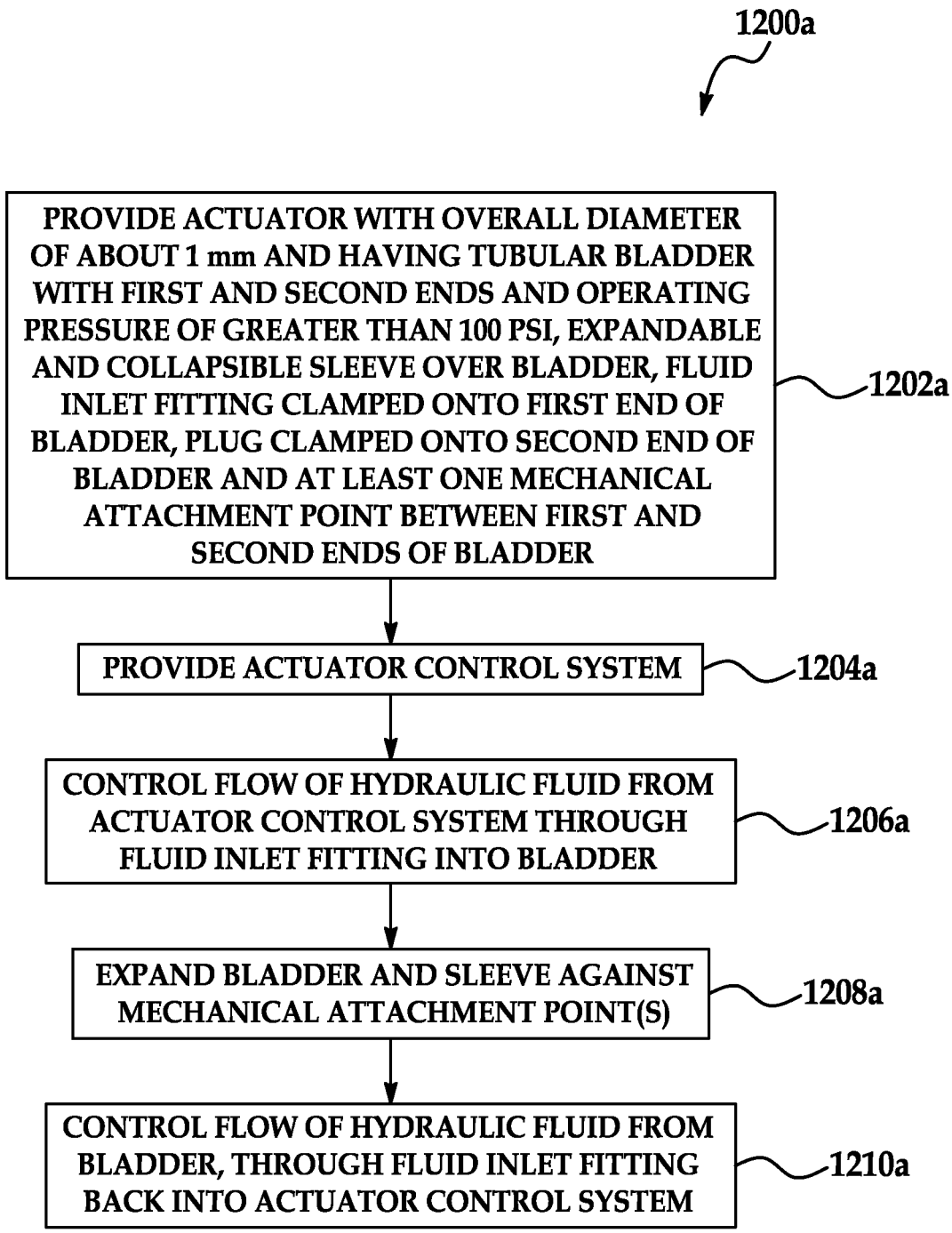
FIG. 12A is an illustration of a flow diagram of a method of controlling a miniature McKibben actuator fabricated according to the method of FIG. 12.

Referring next to FIG. 12A, an illustration of a flow diagram 1200a of controlling a miniature McKibben actuator fabricated according to the method of FIG. 12 is shown. In block 1202a, an actuator 1 is provided. The actuator 1 may have a tubular bladder 2 with first end 3 and second end 4, an expandable and collapsible sleeve 8 over the bladder 2, a fluid inlet fitting 16 clamped onto the first end 3 of the bladder 2, a plug 20 clamped onto the second end 4 of the bladder 2 and at least one mechanical connection 30 between the first 3 and second 4 ends of the bladder 2. The bladder 2 may operate at fluid pressures of greater than 100 psi. In some embodiments, the bladder 2 may operate at fluid pressures of between about 300~600 psi. The bladder 2 may have an overall diameter 5 of less than about 5 mm. In block 1204a, an actuator control system 18 may be provided. In block 1206a, flow of hydraulic fluid 19 from the actuator control system 18 through the fluid inlet fitting 16 into the bladder 2 may be controlled. In block 1208a, the bladder 2 and sleeve 8 may be expanded to move the mechanical connection 30. In block 1210a, flow of hydraulic fluid 19 from the bladder 2, through the fluid inlet fitting 16 and back into the actuator control system 18 may be controlled.

Figure 13:
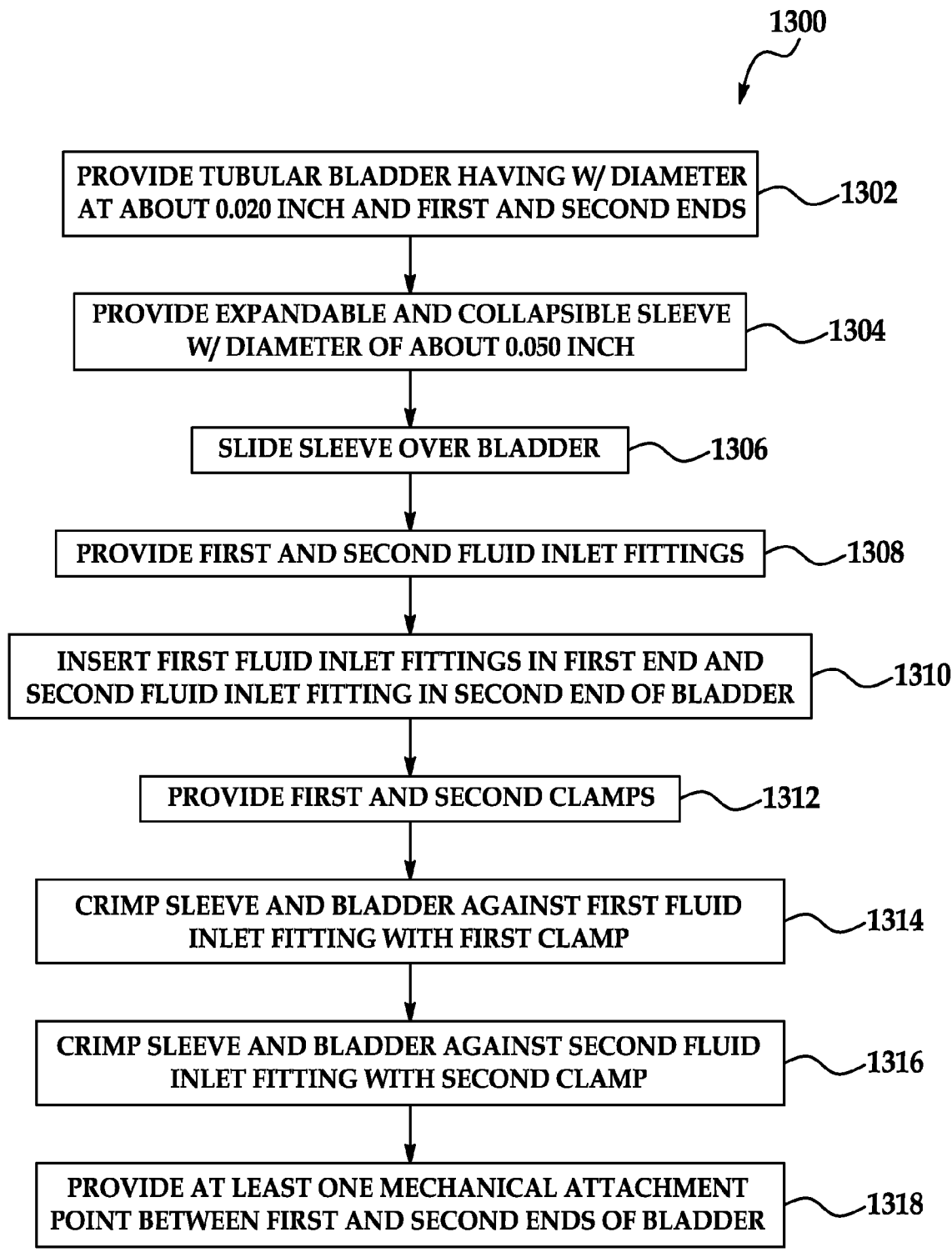
FIG. 13 is an illustration of a flow diagram of a method of fabricating an alternative embodiment of the miniature McKibben actuator.

Referring next to FIG. 13, a flow diagram 1300 of an exemplary method of fabricating an alternative illustrative embodiment of the miniature McKibben actuator 1a is shown. The actuator 1a may have an overall diameter 5 of less than about 5 mm. In block 1302, an elastomeric tubular bladder 2 having first 3 and second 4 ends is provided. In some embodiments, the bladder 2 may have an outer diameter (OD) 2a of about 0.020 inch. The bladder may operate at fluid pressures greater than 100 psi. In some embodiments, the bladder may operate at fluid pressures between about 300~600 psi. In block 1304, an expandable and collapsible sleeve 8 is provided. In some embodiments, the sleeve 8 may be a braided sleeve 8. In some embodiments, the braided sleeve 8 may be a biaxial braided sleeve 8. In some embodiments, the sleeve 8 may have a nominal diameter 37 of about 0.05 inch. In block 1306, the sleeve 8 is slid over the bladder 2. In block 1308, fluid inlet fitting 16 and second 16a fluid inlet fittings are provided. In block 1310, the fluid inlet fitting 16 and second fluid inlet fitting 16a are inserted in the first 3 and second 4 ends, respectively, end of the bladder 2. In block 1312, first clamp 12 and second 13 clamps are provided. In block 1314, the sleeve 8 and the bladder 2 are crimped against the fluid inlet fitting 16 using the first clamp 12. In block 1316, the sleeve 8 and the bladder 2 are crimped against the second fluid inlet fitting 16a using the second clamp 13. In block 1318, at least one first mechanical connection 24 may be provided at the first end 3, the second end 4 and/or between the first end 3 and second end 4 of the bladder 2. In some applications, a first mechanical connection 24 may be provided at the fluid inlet fitting 16 and a second mechanical connection 26 may be provided at the second fluid inlet fitting 16a. In some applications, multiple mechanical connections 30 may be provided between the first mechanical connection 24 and the second mechanical connection 26.

Figure 13A:
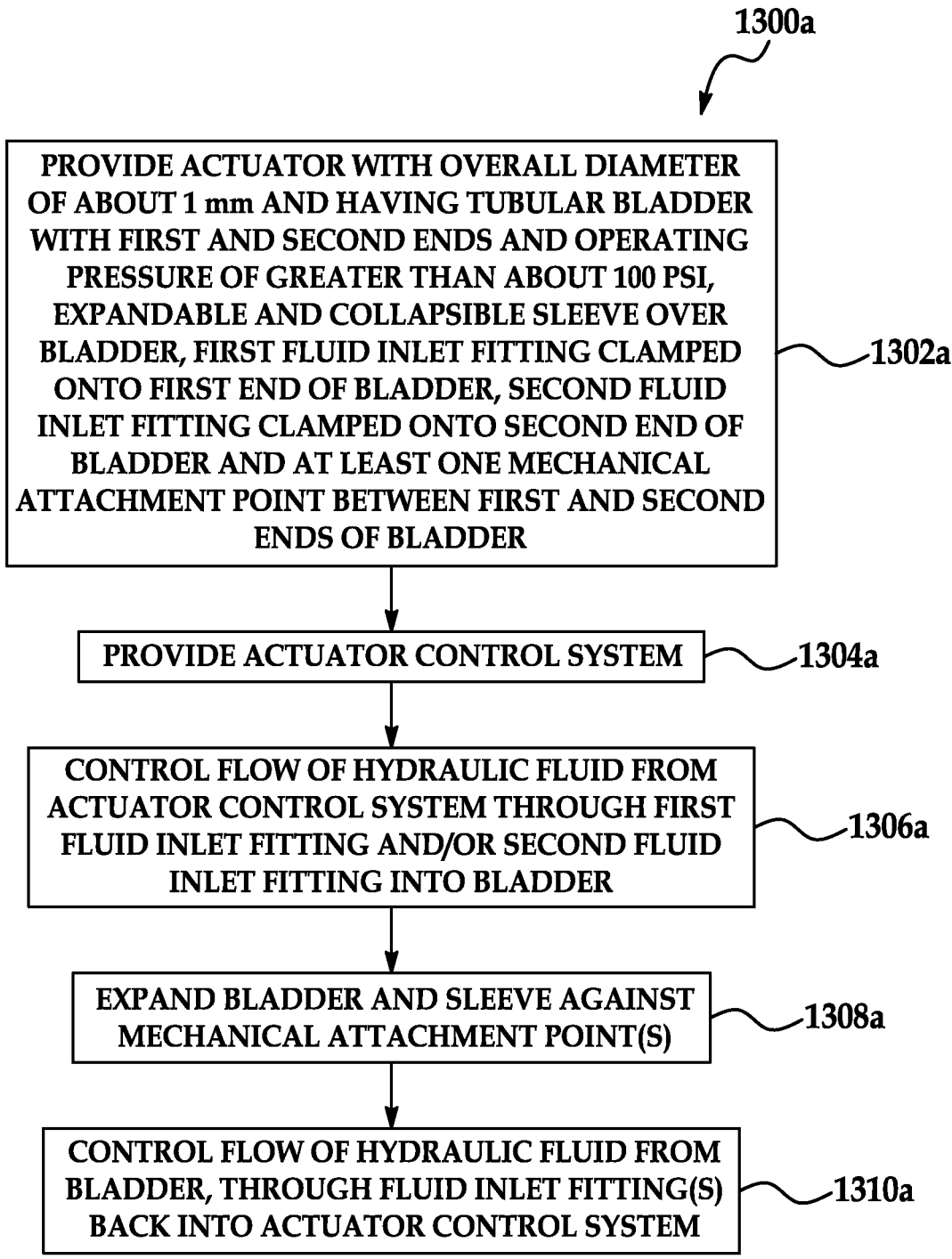
FIG. 13A is an illustration of a flow diagram of a method of controlling a miniature McKibben actuator fabricated according to the method of FIG. 13.

Referring next to FIG. 13A, an illustration of a flow diagram 1300a of controlling a miniature McKibben actuator 1a fabricated according to the method of FIG. 13 is shown. In block 1302a, an actuator 1a is provided. The actuator 1a may have a tubular bladder 2 with first end 3 and second end 4, an expandable and collapsible sleeve 8 over the bladder 2, a fluid inlet fitting 16 clamped first clamp 12 onto the first end 3 of the bladder 2, a second fluid inlet fitting 16a clamped onto the second end 4 of the bladder 2 and at least one mechanical connection 30 between the first end 3 and second end 4 of the bladder 2. The bladder 2 may operate at fluid pressures of greater than 100 psi. In some embodiments, the bladder may operate at fluid pressures of between about 300~600 psi. The actuator 1a may have an overall diameter 5 of less than about 5 mm but larger or smaller diameters may be possible. In block 1304a, an actuator control system 18 may be provided. In block 1306a, flow of hydraulic fluid 19 from the actuator control system 18 through the fluid inlet fitting 16 and/or the second fluid inlet fitting 16a into the bladder 2 may be controlled. In block 1308a, the bladder 2 and sleeve 8 may be expanded to move the mechanical connection 30. In block 1310a, flow of hydraulic fluid 19 from the bladder 2, through the fluid inlet fitting(s) 16, 16a and back into the actuator control system 18 may be controlled.

Figure 13B:
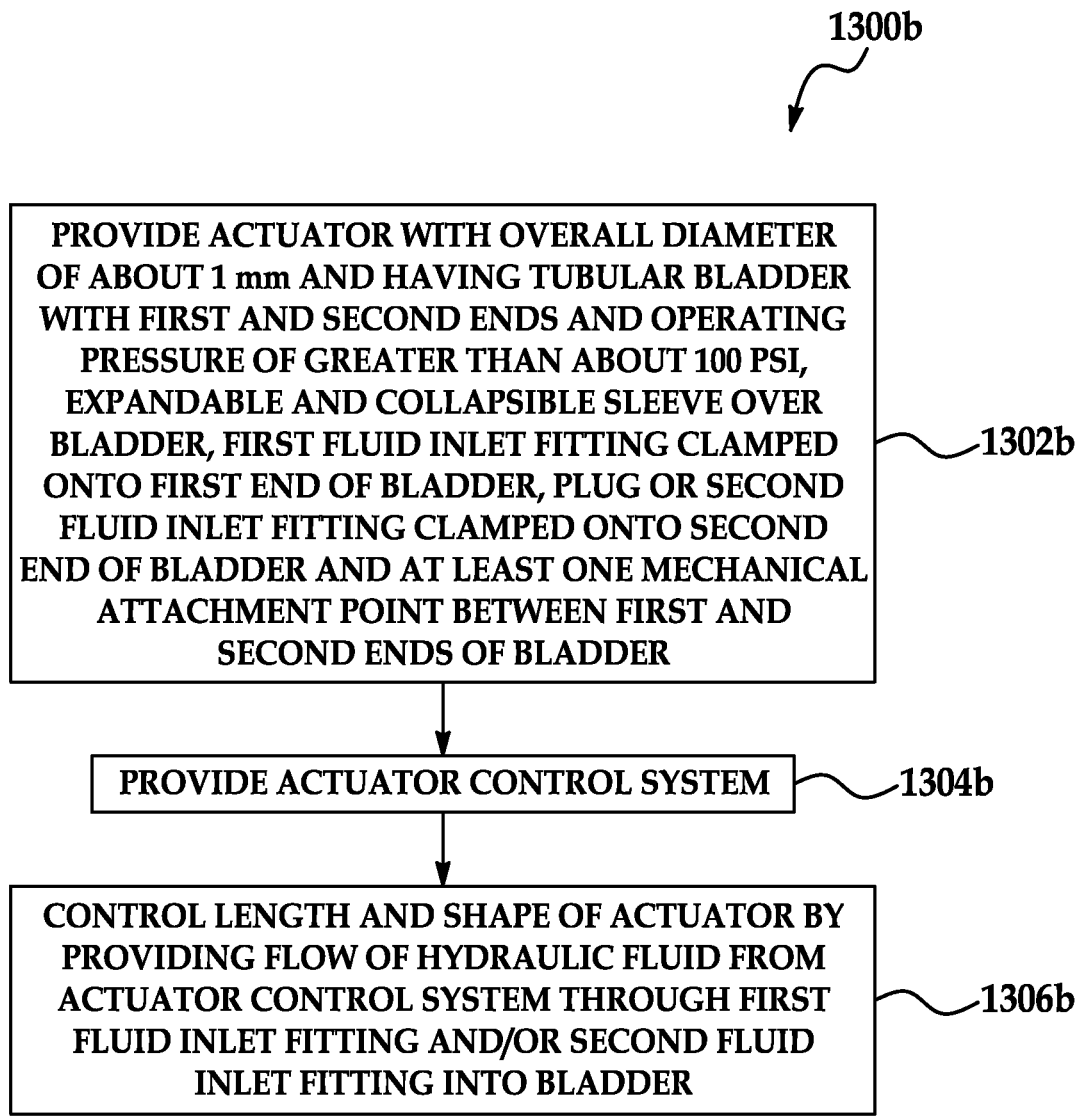
FIG. 13B is an illustration of a flow diagram of a method of controlling the length and shape of a miniature McKibben actuator.

Referring next to FIG. 13B, a flow diagram 1300b of a method of controlling the length 36 (FIG. 1) and shape 40 (FIG. 4) of a miniature McKibben actuator 1, 1a is shown. In block 1302b, a miniature McKibben actuator 1, 1a is provided. The actuator 1, 1a may have an overall diameter of less than about 5 mm. The actuator 1, 1a may include a bladder 2 having first end 3 and second end 4 and an operating pressure of greater than about 100 psi. In some embodiments, the bladder 2 may have an operating pressure of between about 300~600 psi. The actuator 1 may have an expandable and collapsible sleeve 8 over the bladder 2, a fluid inlet fitting 16 clamped first clamp 12 onto the first end 3 of the bladder 2, a plug 20 or second fluid inlet fitting 16b clamped second clamp 13 onto the second end 4 of the bladder 2 and at least one mechanical connection 30 between the first end 3 and second end 4 of the bladder 2. In block 1304b, an actuator control system 18 is provided. In block 1306b, the length 36 and shape 40 of the actuator 1, 1a may be controlled by providing a flow of hydraulic fluid 19 from the actuator control system 18 through the fluid inlet fitting 16 and/or the second fluid inlet fitting 16a into the bladder 2.

Figure 14:
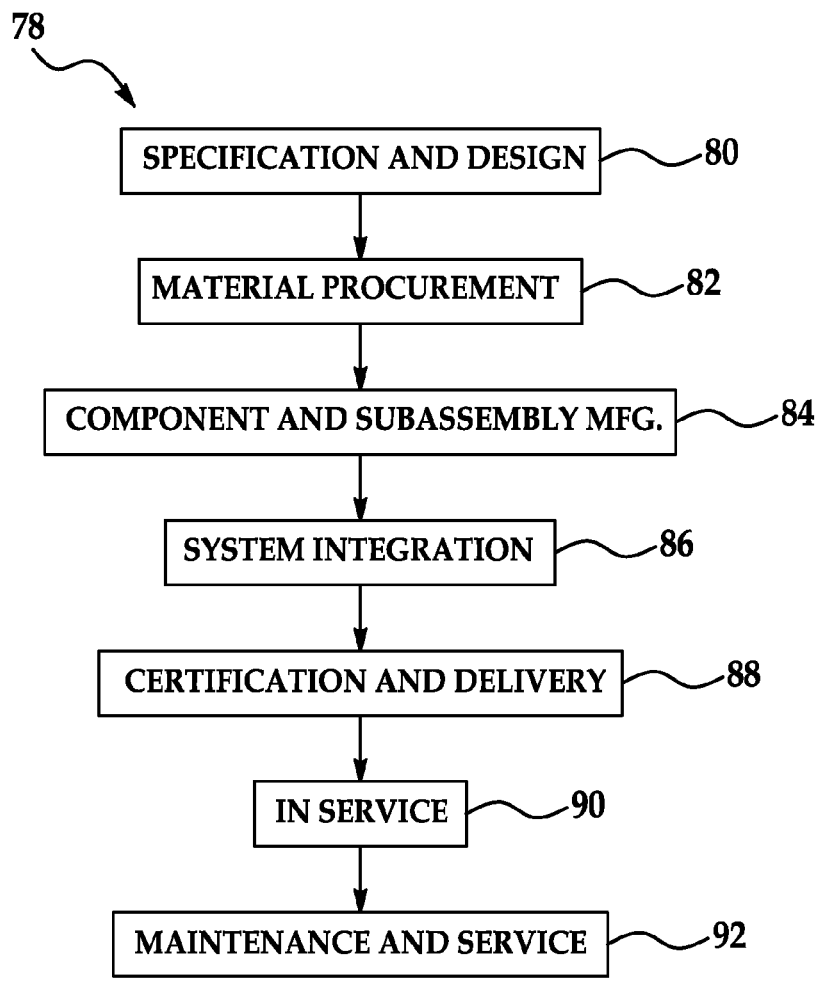
FIG. 14 is an illustration of a flow diagram of an aircraft production and service methodology.
Figure 15:
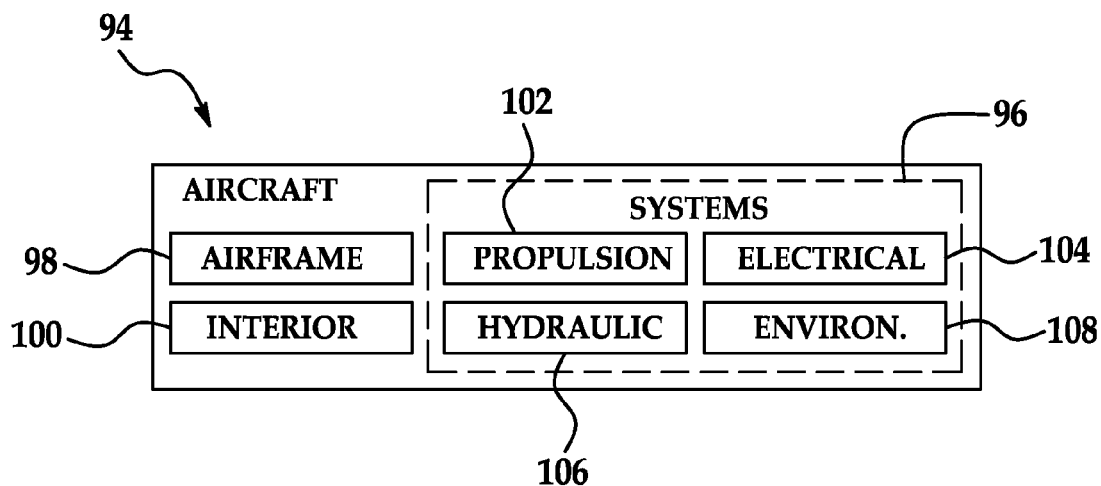
FIG. 15 is an illustration of a block diagram of an aircraft.

Referring next to FIGS. 14 and 15, embodiments of the disclosure may be used in the context of an aircraft manufacturing and service method 78 as shown in FIG. 14 and an aircraft 94 as shown in FIG. 15. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 94 produced by service method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

Thus, the illustrative embodiments provide for a hydraulic actuator. The hydraulic actuator includes a tubular bladder having first and second ends; an expandable and collapsible sleeve provided on said tubular bladder; a fluid inlet fitting provided in fluid communication with said tubular bladder; at least one mechanical connection provided along said tubular bladder; and wherein said hydraulic actuator has flexibility and an overall diameter of less than about 5 mm.

In an illustrative embodiment, the bladder has an outer diameter of about 0.020 inch. In an illustrative embodiment, the bladder operates at fluid pressures greater than 100 psi. In an illustrative embodiment, the bladder operates at fluid pressures between about 300~600 psi.

In an illustrative embodiment, the fluid inlet fitting is provided at said first end of said tubular bladder and further comprising a selected one of a second fluid inlet fitting and a plug provided at said second end of said tubular bladder. In an illustrative embodiment, the selected one of a second fluid inlet fitting and a plug provided at said second end of said tubular bladder comprises a second fluid inlet fitting provided at said second end of said tubular bladder. In an illustrative embodiment, the selected one of a second fluid inlet fitting and a plug provided at said second end of said tubular bladder comprises a plug provided at said second end of said tubular bladder.

In another illustrative embodiment, the hydraulic actuator also includes a first clamp crimping said sleeve and said bladder against said fluid inlet fitting at said first end of said bladder and a second clamp crimping said sleeve and said bladder against said selected one of a second fluid inlet fitting and a plug at said second end of said bladder.

In an illustrative embodiment, the bladder comprises an elastomeric polymer. In an illustrative embodiment, the at least one mechanical connection comprises at least one of the following: a first mechanical connection provided at said fluid inlet fitting, a second mechanical connection provided at said selected one of a second fluid inlet fitting and a plug and at least one mechanical connection provided between said fluid inlet fitting and said selected one of a second fluid inlet fitting and a plug.

In an illustrative embodiment, the sleeve comprises an expandable and collapsible braid. In an illustrative embodiment, the braid comprises a biaxial braid.

The illustrative embodiments provide for another hydraulic actuator. This hydraulic actuator includes a tubular bladder having first and second ends; an expandable and collapsible braided sleeve having a plurality of braid strips provided on said tubular bladder; a fluid inlet fitting provided at said first end of said tubular bladder; a selected one of a second fluid inlet fitting and a plug provided at said second end of said tubular bladder; at least one mechanical connection provided along said tubular bladder; and wherein said hydraulic actuator has flexibility and an overall diameter of less than about 5 mm.

In an illustrative embodiment, the tubular bladder comprises a non-straight tubular bladder and further comprising a sheath receiving said braided sleeve. In an illustrative embodiment, the bladder has an outer diameter of about 0.020 inch. In an illustrative embodiment, said bladder operates at fluid pressures greater than 100 psi.

The illustrative embodiments also provide a method of fabricating a hydraulic actuator. The method includes providing a tubular bladder having first and second ends; providing an expandable and collapsible sleeve; sliding said sleeve over said bladder; providing at least one fluid inlet fitting in fluid communication with said tubular bladder; providing at least one mechanical connection along said bladder; and wherein said hydraulic actuator has flexibility and an overall diameter of less than about 5 mm. In an illustrative embodiment, the providing at least one fluid inlet fitting in fluid communication with said tubular bladder comprises providing a fluid inlet fitting and inserting said fluid inlet fitting in said first end of said bladder.

In an illustrative embodiment, this method may further comprise providing a plug and inserting said plug into said second end of said bladder. In an illustrative embodiment, this method may further comprise providing first and second clamps and crimping said sleeve and said bladder against said fluid inlet fitting with said first clamp and crimping said sleeve and said bladder against said plug with said second clamp.

The illustrative embodiments also provide for a hydraulic actuator. The hydraulic actuator includes an elastomeric tubular bladder having first and second ends and an outer diameter of about 0.020 inch and an operating pressure of between about 300~600 psi; an expandable and collapsible bi-axially braided sleeve having a plurality of braid strips provided on said tubular bladder and having a nominal diameter of less than about 5 mm; a first fluid inlet fitting provided at said first end of said tubular bladder; one of a plug and a second fluid inlet fitting provided at said second end of said tubular bladder; a first mechanical connection provided at said first fluid inlet fitting; an anchoring structure attached to said first mechanical connection; a second mechanical connection provided at said one of a plug and a second fluid inlet fitting; a structure to be loaded attached to said second mechanical connection; and wherein said hydraulic actuator has flexibility and an overall diameter of less than about 5 mm.

The illustrative embodiments also provide for another method for fabricating flexible hydraulic actuator. This method includes providing an elastomeric tubular bladder having first and second ends and an outer diameter of about 0.02 inch and an operating pressure of between about 300~600 psi; providing an expandable and collapsible bi-axially braided sleeve having a plurality of braid strips provided on said tubular bladder and having a nominal diameter of about 0.050 inch; sliding said sleeve over said bladder; providing a fluid inlet fitting at said first end of said tubular bladder and a plug at said second end of said tubular bladder; providing first and second clamps and crimping said sleeve and said bladder against said fluid inlet fitting with said first clamp and crimping said sleeve and said bladder against said plug with said second clamp; providing a first mechanical connection at said fluid inlet fitting; providing a second mechanical connection at said plug; and providing a plurality of mechanical connections between said first mechanical connection and said second mechanical connection.

The illustrative embodiments also provide for another method for controlling a flexible miniature McKibben actuator. This method includes providing an actuator with at least one mechanical attachment point and having an overall diameter of less than about 5 mm; providing an actuator control system; controlling flow of hydraulic fluid from said actuator control system through said fluid inlet fitting into said bladder; moving said mechanical attachment point by expanding said bladder and said sleeve; and controlling flow of hydraulic fluid from said bladder, through said fluid inlet fitting and back into said actuator control system.

The illustrative embodiments also include another method of controlling a length and shape of a flexible hydraulic actuator. The method includes providing a flexible hydraulic actuator having an overall diameter of less than about 5 mm, a bladder having first and second ends and an operating pressure of greater than about 100 psi, an expandable and collapsible sleeve over said bladder and at least one mechanical attachment point between the first and second ends of the bladder; providing an actuator control system; and controlling a length and a shape of said actuator by providing a flow of hydraulic fluid from said actuator control system through at least one of said first fluid fitting and said second fluid inlet fitting into said bladder.

Figure 16:
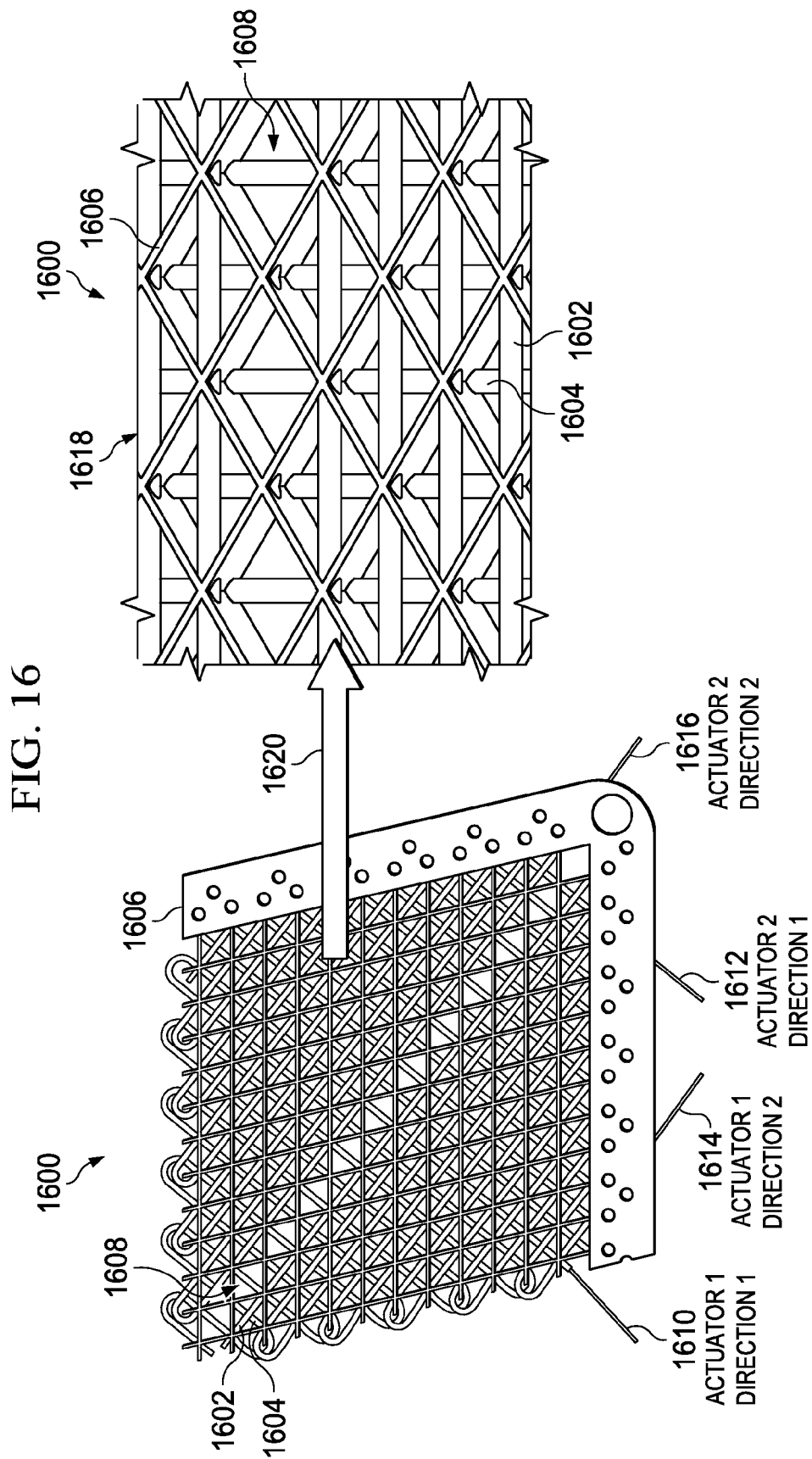
FIG. 16 is an illustration of a McKibben fabric, in accordance with an illustrative embodiment.

FIG. 16 is an illustration of a McKibben fabric, in accordance with an illustrative embodiment. FIG. 16 shows an implementation for the McKibben actuator shown in FIG. 1 through FIG. 11A.

McKibben fabric 1600 may be actuated using fluid pressure, which may be either pneumatic or hydraulic. Use of the term "fluid" herein contemplates either term, or even a combination of hydraulic and pneumatic pressure.

McKibben fabric 1600 may be suitable for use in morphing applications such as UCLASS and Deployable Loitering craft. More particularly, McKibben fabric 1600 may be suitable for morphing deformations of composite materials.

One purpose for McKibben fabric 1600 is to embed actuation in a deformable composite skin or core structure. The embedded, distributed actuation in miniature format in illustrative embodiments may provide a method to globally distribute actuation loads across the morphing skin over a given area. One advantage of this distributed approach is that the approach limits undesirable deformation resulting from perimeter or edge boundary imposed actuation loads. This result precludes the need to extend stiffeners from the perimeter, where the actuation loads would be applied, to the interior portions of the skin panel. Rather, lower, more homogenous planar stiffness skins would receive such distributed, spatially-tailored actuation schemes. Spatial tailoring of the localized actuation deformation does not require individually specified actuators. Rather the McKibben actuator thread disclosed herein, and McKibben fabric 1600, may be arbitrarily anchored to the structural core in multiple discrete locations simply through potting the actuator circumference against or through the structural core member. The arbitrary anchoring can include imposing different prestrains or displacements between attachments, allowing for differential actuation strains and forces to develop in these localize regions from a single remote fluid pressure signal.

Turning again to FIG. 16, McKibben fabric 1600 includes one or more McKibben actuators, such as McKibben actuator 1602 and McKibben actuator 1604, woven into frame 1606. In one illustrative embodiment, McKibben actuator 1602 and McKibben actuator 1604 are a single McKibben actuator woven in a crossed pattern, as shown and described below. Using a single McKibben actuator thread is usually preferable, as a single thread simplifies the number of closures or connections used to close a fluid circuit. However, in another illustrative embodiment, McKibben actuator 1602 and McKibben actuator 1604 are separate McKibben actuators woven, as shown and described below.

Frame 1606 may be a grid supported by one or more sides, as shown, but may take many different forms. Frame 1606 may be fabricated from metal, ceramic, composites, plastics, or other suitable materials strong enough to handle the forces expected to be exerted by McKibben actuator 1602 and McKibben actuator 1604. In an illustrative embodiment, not all cells of the grid need be filled by both McKibben actuator 1604 and McKibben actuator 1602, but may contain only one or neither. For example, grid 1608 contains only McKibben actuator 1604, as shown in FIG. 16, though this arrangement is not the only possible arrangement.

As shown in FIG. 16, McKibben actuator 1602 is woven throughout the cells of McKibben fabric 1600 along a first direction corresponding to axis 1610, or axes parallel to axis 1610. For example, axis 1612 is parallel to axis 1610. In contrast, McKibben actuator 1604 is woven throughout the cells of McKibben fabric 1600 along a second direction corresponding to 1614, or axes parallel to axis 1614. For example, axis 1616 is parallel to axis 1614.

Section 1618 shows an expanded view of a portion of McKibben fabric 1600 shown generally at the base of arrow 1620. Again, McKibben fabric 1600 shows McKibben actuator 1602 and McKibben actuator 1604 woven within the cells of frame 1606.

Attention is now turned to a specific implementation of McKibben fabric 1600. Many different implementations are also possible; thus, this specific implementation of McKibben fabric 1600 does not necessarily limit the claims.

McKibben fabric 1600 may be fabricated from 2"×0.035" diameter McKibben actuators oriented at 90 degrees to each other. This arrangement permits and promotes antagonistic actuation. McKibben fabric 1600 is sandwiched between two 0.025" thick metallic grids, or cells, made through chemical etching of high strength steel. Cutouts are provided within the walls of the cells to accept one or more actuators passing through to each other cell. This two layer grid plus unidirectional actuator is stacked with a second grid stack to provide the antagonistic actuation scheme.

Thus, McKibben fabric 1600 is integrated into a 0.1" thick core and provides shear deformations of 15% shear. Accordingly, rather than create 144 individually specifiable biaxial pressurization regions and the associated manifold required to address the distributed actuation needs, here only 4 pressurization ports are presented to simplify the connection to the pressurization circuit. This implementation of McKibben fabric 1600 is only possible with small McKibben actuators provided by the illustrative embodiments. As used herein, the term "small" McKibben actuator is defined as a McKibben actuator that has a diameter of about 0.035" or less. A small McKibben actuator typically uses between about 150 PSI and about 300 PSI fluid pressure, but this pressure may be more or less in different illustrative embodiments.

Attention is now turned to additional specific implementations of "small" McKibben actuators, as well as their advantages over known McKibben actuators. For a small McKibben actuator, overbraiding the tubing is critical, such that when the tube is pressurized from the interior, the tube is not allowed to expand and overinflate locally. In an illustrative embodiment, overbraiding may be eight threads that are about 200 denier braided over the outer diameter of the tubular bladder. More threads may be used and/or greater denier threads may be used.

The tubular bladder may be composed of silicone, but other materials may be used. The threads may be composed of para-aramid synthetic fibers, such as poly-para-phenylene terephthalamide (marketed under the trade name KEVLAR®), though other materials may be used.

Small McKibben actuators have advantages over larger McKibben actuators. For example, for small McKibben actuators, the continuously supported braid on the exterior prevents unwanted localized radial deformations. Additionally, the resulting braid-covered tube can be made arbitrarily long and cut to the desired length. Large McKibben actuators are typically limited in length. Thus, a small McKibben actuator may be used to implement McKibben actuator 1602 and McKibben actuator 1604 as a single long McKibben actuator, whereas larger McKibben actuators could not be used in a correspondingly larger structure. In other words, a larger McKibben actuator could not be used to implement McKibben actuator 1602 and McKibben actuator 1604 is a single long McKibben actuator.

Another advantage of a small McKibben actuator is the ability of the small McKibben actuator to be used in conventional textile fabrication equipment such that fabrics of such actuator "thread" could be made or incorporated. Open ends could be closed or connected to a manifold to establish the fluid circuit. Thus, fabrics, particularly weft knits fabrics, can be made from a single continuous length of actuator thread. Using a single thread minimizes the number or closures or connections, simplifying the physical layout used to complete the fluid circuit. Larger McKibben actuators could not be integrated using such textile equipment.

The illustrative embodiments are distinct in other ways from known McKibben actuators. For example, the illustrative embodiments have a thick wall of the tube relative to the diameter ($t/D \leq 2$), whereas known McKibben actuators assume thin walls for the tube element ($t/D > 2$ to about $t/D < 10$). For small McKibben actuators, the pressurization of the tube requires significantly more deformation of the wall prior to causing global radial changes that produce the kinematic actuation expected of McKibben actuators. Standard thick wall assumptions are $t/D < 10$ for mechanics calculations where shear deformation contributes nontrivially.

While known thick wall McKibben actuators require higher pressures than the thin wall variants, the thick wall provides for robust operation that resists puncture and cutting due to the kinematic motion of the braid material. In known commercial products, diameters less than 0.125 inch in outer diameter are typically not available. Furthermore available McKibben actuators typically have length to diameter of less than a ratio of 10:1. In contrast, some of the illustrative embodiments use continuous actuators exceeding a length to diameter ratios of >25 and more commonly ratios of >100.

In addition, the illustrative embodiments are different than known McKibben actuators because of the flexible and arbitrary nature of the attachment location and differential prestrain conditions between attachment locations. Still further, the long length and small diameter of small McKibben actuators permits processing into fabrics and preforms suitable for large area integration directly into composite layups. These composites would be required to be stiffness-matched to the actuation layer in order to take advantage of the actuation displacement. Larger McKibben actuators cannot be used for large area fabrics, and are particularly unsuited for use in composite layups.

Yet further, the long length of the illustrative embodiments allows for minimal fluid connections, preferably at an edge of the morphing panel where the fluid circuits can be completed at a manifold. For composite layups, such an arrangement is not possible with larger McKibben actuators because more fluid connections will be required relative to small, long-length McKibben actuators.

Thus, the illustrative embodiments provide for a number of different embodiments. In one illustrative embodiment, a fluid actuator is provided. The fluid actuator may be a tubular bladder having first and second ends, the tubular bladder having an outer diameter of about 0.020 inches or less and an inner diameter of about 0.010 inches or less, and further wherein the tubular bladder has a diameter to thickness ratio of at least 2. The fluid actuator may further include an overbraided sleeve covering the outer diameter of the tubular bladder, wherein overbraided is defined as at least about eight threads of at least about two hundred denier, the threads being braided over the outer diameter of the tubular bladder, wherein the tubular bladder and the overbraided sleeve has a combined overall diameter of about 0.035 inches or less, and wherein the tubular bladder and the overbraided sleeve has a length to diameter ratio of than about 25 to 1 or greater. The fluid actuator may further include a fluid inlet fitting provided in fluid communication with the tubular bladder. The fluid actuator may further include at least one mechanical connection provided along the tubular bladder.

In another illustrative embodiment, fibers used in fabrication of the overbraided sleeve are sufficiently spread over the tubular bladder such that the overbraided sleeve does not cut into the tubular bladder but still maintains biaxial kinematics permitting actuation of the fluid actuator. In an illustrative embodiment, the bladder operates at fluid pressures between about 150-600 psi.

In an illustrative embodiment, the fluid inlet fitting is provided at the first end of the tubular bladder and further comprising a selected one of a second fluid inlet fitting and a plug provided at the second end of the tubular bladder. In this case, the selected one of a second fluid inlet fitting and a plug provided at the second end of the tubular bladder may be a second fluid inlet fitting provided at the second end of the tubular bladder. Alternatively, the selected one of a second fluid inlet fitting and a plug provided at the second end of the tubular bladder may be a plug provided at the second end of the tubular bladder.

In another illustrative embodiment, the fluid actuator further includes a first clamp crimping the sleeve and the bladder against the fluid inlet fitting at the first end of the bladder and a second clamp crimping the sleeve and the bladder against the selected one of a second fluid inlet fitting and a plug at the second end of the bladder. In another illustrative embodiment, the at least one mechanical connection may be at least one of the following: a first mechanical connection provided at the fluid inlet fitting, a second mechanical connection provided at the selected one of a second fluid inlet fitting and a plug and at least one mechanical connection provided between the fluid inlet fitting and the selected one of a second fluid inlet fitting and a plug. In this case, the overbraided sleeve may be a biaxial braid.

The illustrative embodiments also provide that the fluid actuator is woven in a crossed pattern and supported by a frame comprising a grid. The illustrative embodiments also provide that the overbraided sleeve may be braided tows or fibers, and wherein the braided tows or fibers used in fabrication of the overbraided sleeve are sufficiently spread over the tubular bladder such that the braided tows or fibers do not cut into the tubular bladder but still maintain biaxial kinematics permitting actuation of the fluid actuator.

The illustrative embodiments also provide for a device. The device includes a frame comprising a grid and a fluid actuator. The fluid actuator may include a tubular bladder having first and second ends, the tubular bladder having an outer diameter of about 0.020 inches or less and an inner diameter of about 0.010 inches or less, and further wherein the tubular bladder has a thickness to diameter ratio of at least 2. The fluid actuator may further include an overbraided sleeve covering the outer diameter of the tubular bladder, wherein overbraided is defined as at least about eight threads of at least about two hundred denier, the threads being braided over the outer diameter of the tubular bladder, wherein the tubular bladder and the overbraided sleeve has a combined overall diameter of about 0.035 inches or less, and wherein the tubular bladder and the overbraided sleeve has a length to diameter ratio of than about 25 to 1 or greater. The fluid actuator may be woven in a crossed pattern throughout at least some cells of the grid. The fluid actuator may further include a fluid inlet fitting provided at the first end of the tubular bladder. A selected one of a second fluid inlet fitting and a plug provided may be provided at the second end of the tubular bladder. At least one mechanical connection may be provided along the tubular bladder.

In an illustrative embodiment, the tubular bladder may be a non-straight tubular bladder and further may be a sheath receiving the overbraided sleeve. In an illustrative embodiment, the fluid actuator is only woven once through at least some cells of the grid. In an illustrative embodiment, the frame is disposed within a composite layup.

The illustrative embodiments also provide for a method of fabricating a fluid actuator. The method may include providing a tubular bladder having first and second ends, the tubular bladder having an outer diameter of about 0.020 inches or less and an inner diameter of about 0.010 inches or less, and further wherein the tubular bladder has a thickness to diameter ratio of at least 2. The method may further include providing an overbraided sleeve covering the outer diameter of the tubular bladder, wherein overbraided is defined as at least about eight threads of at least about two hundred denier, the threads being braided over the outer diameter of the tubular bladder, wherein the tubular bladder and the overbraided sleeve has a combined overall diameter of about 0.035 inches or less, and wherein the tubular bladder and the overbraided sleeve has a length to diameter ratio of than about 25 to 1 or greater. The method may further include sliding the overbraided sleeve over the tubular bladder. The method may further include providing at least one fluid inlet fitting in fluid communication with the tubular bladder. The method may further include providing at least one mechanical connection along the bladder.

In an illustrative embodiment, providing at least one fluid inlet fitting in fluid communication with the tubular bladder may include providing a fluid inlet fitting and inserting the fluid inlet fitting in the first end of the bladder. In this case, the method may further include further comprising providing a plug and inserting the plug into the second end of the bladder.

In an illustrative embodiment, the method may further include threading the fluid actuator through a grid of a frame. In an illustrative embodiment, the method may further include placing the frame in a composite layup.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fluid actuator, comprising:
   a tubular bladder having first and second ends, the tubular bladder having an outer diameter of about 0.020 inches or less and an inner diameter of about 0.010 inches or less, and further wherein the tubular bladder has a diameter to thickness ratio of at least 2;
   an overbraided sleeve covering the outer diameter of the tubular bladder, wherein overbraided is defined as at least about eight threads of at least about two hundred denier, the threads being braided over the outer diameter of the tubular bladder, wherein the tubular bladder and the overbraided sleeve has a combined overall diameter of about 0.035 inches or less, and wherein the tubular bladder and the overbraided sleeve has a length to diameter ratio of than about 25 to 1 or greater;
   a fluid inlet fitting provided in fluid communication with the tubular bladder; and
   at least one mechanical connection provided along the tubular bladder;
   wherein the fluid actuator is woven in a crossed pattern and supported by a frame comprising a grid.

2. The fluid actuator of claim 1, wherein fibers used in fabrication of the overbraided sleeve are sufficiently spread over the tubular bladder such that the overbraided sleeve does not cut into the tubular bladder but still maintains biaxial kinematics permitting actuation of the fluid actuator.

3. The fluid actuator of claim 1, wherein the bladder operates at fluid pressures between about 150-600 psi.

4. The fluid actuator of claim 1, wherein the fluid inlet fitting is provided at the first end of the tubular bladder and further comprising a selected one of a second fluid inlet fitting and a plug provided at the second end of the tubular bladder.

5. The fluid actuator of claim 4, wherein the selected one of a second fluid inlet fitting and a plug provided at the second end of the tubular bladder comprises a second fluid inlet fitting provided at the second end of the tubular bladder.

6. The fluid actuator of claim 4, wherein the selected one of a second fluid inlet fitting and a plug provided at the second end of the tubular bladder comprises a plug provided at the second end of the tubular bladder.

7. The fluid actuator of claim 6 further comprising a first clamp crimping the sleeve and the bladder against the fluid inlet fitting at the first end of the bladder and a second clamp crimping the sleeve and the bladder against the selected one of a second fluid inlet fitting and a plug at the second end of the bladder.

8. The fluid actuator of claim 4, wherein the at least one mechanical connection comprises at least one of the following: a first mechanical connection provided at the fluid inlet fitting, a second mechanical connection provided at the selected one of a second fluid inlet fitting and a plug and at least one mechanical connection provided between the fluid inlet fitting and the selected one of a second fluid inlet fitting and a plug.

9. The fluid actuator of claim 8, wherein the overbraided sleeve comprises a biaxial braid.

10. The fluid actuator of claim 1, wherein the overbraided sleeve comprises braided tows or fibers, and wherein the braided tows or fibers used in fabrication of the overbraided sleeve are sufficiently spread over the tubular bladder such that the braided tows or fibers do not cut into the tubular bladder but still maintain biaxial kinematics permitting actuation of the fluid actuator.

11. A device, comprising:
   a frame comprising a grid;
   a fluid actuator comprising:
   a tubular bladder having first and second ends, the tubular bladder having an outer diameter of about 0.020 inches or less and an inner diameter of about 0.010 inches or less, and further wherein the tubular bladder has a diameter to thickness ratio of at least 2;
   an overbraided sleeve covering the outer diameter of the tubular bladder, wherein overbraided is defined as at least about eight threads of at least about two hundred denier, the threads being braided over the outer diameter of the tubular bladder, wherein the tubular bladder and the overbraided sleeve has a combined overall diameter of about 0.035 inches or less, and wherein the tubular bladder and the overbraided sleeve has a length to diameter ratio of than about 25 to 1 or greater;

wherein the fluid actuator is woven in a crossed pattern throughout at least some cells of the grid;

a fluid inlet fitting provided at the first end of the tubular bladder;

a selected one of a second fluid inlet fitting and a plug provided at the second end of the tubular bladder; and at least one mechanical connection provided along the tubular bladder.

12. The device of claim 11, wherein the tubular bladder comprises a non-straight tubular bladder and further comprising a sheath receiving the overbraided sleeve.

13. The device of claim 11, wherein the fluid actuator is only woven once through at least some cells of the grid.

14. The device of claim 11, wherein the frame is disposed within a composite layup.

15. A method of fabricating a fluid actuator, comprising:
providing a tubular bladder having first and second ends, the tubular bladder having an outer diameter of about 0.020 inches or less and an inner diameter of about 0.010 inches or less, and further wherein the tubular bladder has a diameter to thickness ratio of at least 2;

providing an overbraided sleeve covering the outer diameter of the tubular bladder, wherein overbraided is defined as at least about eight threads of at least about two hundred denier, the threads being braided over the outer diameter of the tubular bladder, wherein the tubular bladder and the overbraided sleeve has a combined overall diameter of about 0.035 inches or less, and wherein the tubular bladder and the overbraided sleeve has a length to diameter ratio of than about 25 to 1 or greater, wherein the overbraided sleeve is woven in a crossed pattern and supported by a frame comprising a grid;

sliding the overbraided sleeve over the tubular bladder;

providing at least one fluid inlet fitting in fluid communication with the tubular bladder; and providing at least one mechanical connection along the bladder.

16. The method of claim 15, wherein the providing at least one fluid inlet fitting in fluid communication with the tubular bladder comprises providing a fluid inlet fitting and inserting the fluid inlet fitting in the first end of the bladder.

17. The method of claim 16 further comprising providing a plug and inserting the plug into the second end of the bladder.

18. The method of claim 15 further comprising:
threading the fluid actuator through a grid of a frame.

19. The method of claim 18 further comprising:
placing the frame in a composite layup.

* * * * *

UNITED STATES PATENT AND TRADEMARK OFFICE
CERTIFICATE OF CORRECTION

PATENT NO. : 9,541,196 B2
APPLICATION NO. : 14/228252
DATED : January 10, 2017
INVENTOR(S) : Henry et al.

Page 1 of 1

It is certified that error appears in the above-identified patent and that said Letters Patent is hereby corrected as shown below:

In the Claims

Column 18, Line 4, change "sleeve has" to -- sleeve have --
    Line 5, change "of than about" to -- of about --
Column 19, Line 1, change "sleeve has" to -- sleeve have --
    Line 4, change "of than about" to -- of about --
Column 20, Line 4, change "sleeve has" to -- sleeve have --
    Line 7, change "of than about" to -- of about --

Signed and Sealed this
Sixth Day of February, 2018

Joseph Matal
*Performing the Functions and Duties of the*
*Under Secretary of Commerce for Intellectual Property and*
*Director of the United States Patent and Trademark Office*